United States Patent
Yamamoto et al.

(10) Patent No.: US 10,899,292 B2
(45) Date of Patent: Jan. 26, 2021

(54) METHOD OF MANUFACTURING INSULATOR

(71) Applicant: FUTABA INDUSTRIAL CO., LTD., Okazaki (JP)

(72) Inventors: Kouhei Yamamoto, Okazaki (JP); Masatoshi Kato, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 157 days.

(21) Appl. No.: 16/197,630

(22) Filed: Nov. 21, 2018

(65) Prior Publication Data
US 2019/0161029 A1 May 30, 2019

(30) Foreign Application Priority Data

Nov. 24, 2017 (JP) .................................. 2017-225675

(51) Int. Cl.
*F01N 13/14* (2010.01)
*B60R 13/08* (2006.01)
(Continued)

(52) U.S. Cl.
CPC .......... *B60R 13/0876* (2013.01); *F01N 13/14* (2013.01); *F16L 59/024* (2013.01); *F02B 37/00* (2013.01); *F02B 39/00* (2013.01)

(58) Field of Classification Search
CPC . B60R 13/0876; F01N 13/14; F01N 13/1888; F01N 3/2853; F01N 3/10;
(Continued)

(56) References Cited

U.S. PATENT DOCUMENTS 6,231,818 B1 * 5/2001 Teneyck ............. B01D 53/9454
422/179
6,245,301 B1 * 6/2001 Stroom ................. F01N 3/0211
422/179
(Continued)

FOREIGN PATENT DOCUMENTS

| JP | 2002106336 A | 4/2002 |
| JP | 2004-360501 A | 12/2004 |
| WO | 2015051922 A1 | 4/2015 |

OTHER PUBLICATIONS

Notice of Reasons for Refusal for Japanese Patent Application No. 2017-225675 dated Nov. 26, 2019 (4 pages including English translation).

*Primary Examiner* — Rick K Chang
(74) *Attorney, Agent, or Firm* — Withrow & Terranova, P.L.L.C.; Vincent K. Gustafson (57) ABSTRACT

A method of manufacturing an insulator is provided. The insulator includes a lower member and an upper member. The lower member is placed as a second flange of the lower member is fixed in position. The upper member is then disposed on the lower member as the second flange of the upper member is fixed in position. Accordingly, the first flange of the upper member and the first flange of the lower member abut each other, and the second flange of the upper member and the second flange of the lower member abut each other. Then, the first flange of the upper member and the first flange of the lower member are swaged, and then the second flange of the upper member and the second flange of the lower member are swaged.

5 Claims, 7 Drawing Sheets

(51) Int. Cl.
*F16L 59/02* (2006.01)
*F02B 39/00* (2006.01)
*F02B 37/00* (2006.01)

(58) Field of Classification Search
CPC .............. F01N 2470/18; F01N 2450/02; F16L 59/024; F02B 37/00; F02B 39/00
See application file for complete search history.

(56) References Cited

U.S. PATENT DOCUMENTS

| | | | | |
|---|---|---|---|---|
| 6,983,768 | B1* | 1/2006 | Vujic | F16L 59/141 |
| | | | | 138/119 |
| 7,041,359 | B2* | 5/2006 | Hijikata | B01D 39/2068 |
| | | | | 422/179 |
| 7,087,286 | B2* | 8/2006 | Hijikata | B01D 39/2068 |
| | | | | 422/177 |
| 7,273,649 | B2* | 9/2007 | Miwa | F01N 3/0222 |
| | | | | 422/177 |
| 7,316,803 | B2* | 1/2008 | Weber | F01N 3/2853 |
| | | | | 422/179 |
| 7,823,285 | B2* | 11/2010 | Cai | F01N 3/2853 |
| | | | | 29/455.1 |
| 7,879,430 | B2* | 2/2011 | Ohno | B01J 23/42 |
| | | | | 428/116 |
| 2005/0272602 | A1* | 12/2005 | Ninomiya | C04B 38/0016 |
| | | | | 502/439 |
| 2017/0284272 | A1 | 10/2017 | Wolf et al. | |

* cited by examiner

METHOD OF MANUFACTURING INSULATOR

CROSS-REFERENCE TO RELATED APPLICATIONS

This application claims the benefit of Japanese Patent Application No. 2017-225675 filed on Nov. 24, 2017 in the Japan Patent Office, the entire disclosure of which is incorporated herein by reference.

BACKGROUND

The present disclosure relates to a method of manufacturing an insulator configured to be situated over an exhaust member that carries exhaust air from an engine of a vehicle downstream.

A tubular heat-insulation covering for covering an outer side of an exhaust system component of a vehicle is known. Japanese Unexamined Patent Application Publication No. 2004-360501 (Patent Document 1) discloses a method of placing such a heat-insulation covering over an exhaust system component. According to the disclosed method, L-shaped brackets are welded to an outer surface of a pipe-shaped exhaust system component. The heat-insulation covering is swaged with the brackets and thus placed over the outer side of the exhaust system component.

SUMMARY

However, the method disclosed in Patent Document 1 has some risks such as deformation of the heat-insulation covering when the heat-insulation covering is swaged with the bracket if, for example, the heat-insulation covering has a low stiffness.

Desirably, a low-stiffness insulator can be favorably manufactured.

According to a method of manufacturing an insulator in the present disclosure, an insulator is manufactured of a lower member and an upper member. The insulator is a tubular member and is configured to cover a side surface of an exhaust member that carries exhaust air from an engine of a vehicle downstream. The lower member includes a groove, a first flange of the lower member and a second flange of the lower member protruding outwardly from a side rim of the groove. The upper member includes a groove, a first flange of the upper member and a second flange of the upper member protruding outwardly from a side rim of the groove.

The method of manufacturing the insulator comprises placing the lower member in a first state. The first flange of the lower member is situated opposite to the second flange of the lower member across the groove of the lower member. In the first state, an outer side of the groove of the lower member is supported from below by a lower retainer; the first flange of the lower member is supported from below by a first base; the second flange of the lower member is supported from below by a second base; and the second flange of the lower member is fixed in position by a base hold situated in the second base and by a flange securing part disposed in the second flange of the lower member.

The method comprises placing the upper member in a second state. The first flange of the upper member is situated opposite to the second flange of the upper member across the groove of the upper member. In the second state, an inner side of the groove of the upper member faces an inner side of the groove of the lower member; the first flange of the upper member abuts the first flange of the lower member and is simultaneously supported from below by the first base; the second flange of the upper member abuts the second flange of the lower member and is simultaneously supported from below by the second base; and the second flange of the upper member is fixed in position by the base hold situated in the second base and by a flange securing part disposed in the second flange of the upper member.

The method comprises placing an upper retainer to cover an outer side of the groove of the upper member from above. The method further comprises swaging the first flange of the upper member with the abutting first flange of the lower member. The method further comprises swaging the second flange of the upper member with the abutting second flange of the lower member.

According to this method, in the swaging of the first flanges of the lower member and the upper member, the second flanges of the lower member and the upper member are fixed to the second base via the flange securing part and the base hold. Also, the groove of the lower member is supported from below by the lower retainer as the groove of the upper member is pressed from above by the upper retainer. Consequently, the entire lower member and the entire upper member is favorably fixed when swaging the first flanges, which results in reduction of deformation of both or one of the lower member and the upper member.

Likewise, the groove of the lower member is supported from below by the lower retainer, and the groove of the upper member is pressed from above by the upper retainer when swaging the second flanges. In this swaging, the first flanges are coupled by swaging. Consequently, the entire lower member and the entire upper member are favorably fixed when swaging the second flanges, which results in reduction of deformation of both or one of the lower member and the upper member.

Accordingly, a low-stiffness insulator can be favorably manufactured.

In the aforementioned method of manufacturing the insulator, the exhaust member may be placed inside the groove of the lower member after disposing the lower member in the first state. In addition, in the second state, the inner side of the groove of the upper member may face the inner side of the groove of the lower member and the exhaust member.

According to this method, the exhaust member can be preferably placed.

The base hold may include a projecting portion projecting upwardly from the second base. The flange securing part may include a hole formed on the second flange of the upper member and a hole formed on the second flange of the lower member. In the first state, the second flange of the lower member is fixed in position due to the projecting portion of the second base being fitted to the hole formed on the second flange of the lower member. In the second state, the second flange of the upper member may be fixed in position due to the projecting portion of the second base being fitted to the hole formed on the second flange of the upper member. The projecting portion of the second base may be removed from the holes of the second flange of the lower member and the second flange of the upper member after the first flange of the upper member is swaged with the first flange of the lower member. The second flange of the upper member may be swaged with the second flange of the lower member after the removal of the projecting portion.

According to this method, the second flange can be preferably fixed to the second base.

In the swaging of the first flange of the upper member with the abutting first flange of the lower member, and in the swaging of the second flange of the upper member with the abutting second flange of the lower member, at least the first flange of the lower member may be folded and placed on an upper side and a lower side of the first flange of the upper member to form a folded flange, or the second flange of the lower member may be folded and placed on an upper side and a lower side of the second flange of the upper member to form a folded flange. The folded flange may be crimped to form a downwardly projecting V-shape.

According to this method, the first or the second flange of the upper member and the lower member can be preferably coupled.

The exhaust member may be configured to carry the exhaust air downstream towards a turbine that drives a turbocharger disposed in the engine.

According to this configuration, a low-stiffness insulator configured to reduce noises form a turbocharger can be favorably manufactured.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

The present disclosure is not limited to the embodiments explained hereinafter and may be modified in various modes within the technical scope of the present disclosure.

Configuration of Insulator

Figure 1:
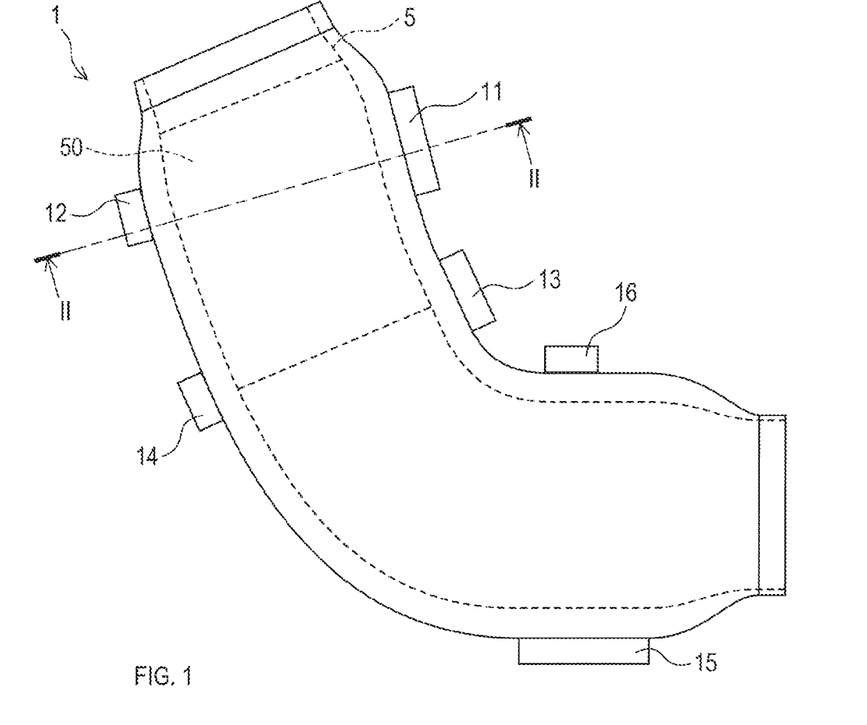
FIG. 1 is a schematic side view of an insulator.

As shown in FIG. 1, an insulator 1 in the present embodiment is a tubular member mounted to a vehicle. The insulator 1 is made of, for example, stainless-steel or aluminum. The insulator 1 mounted to the vehicle includes an exhaust member 5 situated inside the insulator 1 and covers a side surface of the exhaust member 5. The exhaust member 5 is configured to carry exhaust air from an engine of the vehicle downstream. The insulator 1 reduces at least some of noise, vibration, and heat dissipation from the exhaust member 5.

In one example, the exhaust member 5 carries the exhaust air downstream towards a turbine that drives a turbocharger disposed in the engine. More specifically, the exhaust member 5 comprises a converter 50 that comprises a catalyst 51 to purify the exhaust air. The insulator 1 covers an area in an outer side of the exhaust member 5 including where the converter 50 is situated. The insulator 1 may also be placed on another exhaust member in the vehicle.

Figure 2:
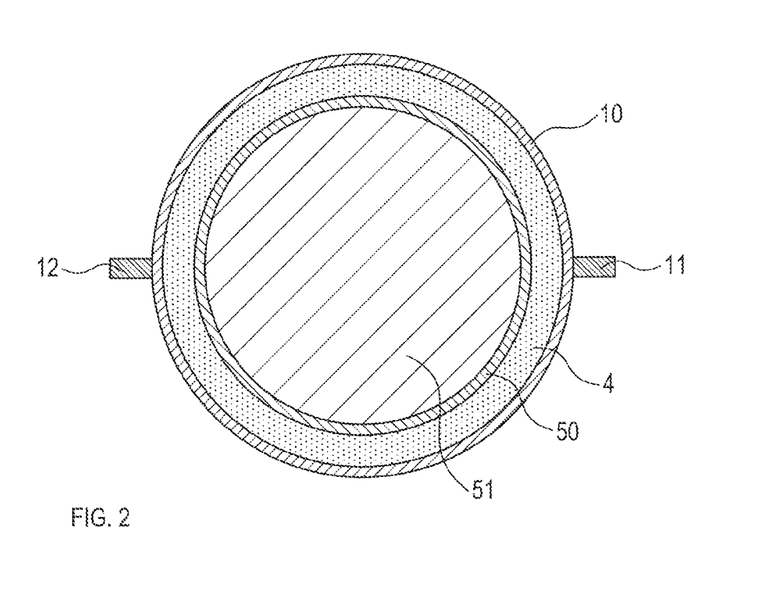
FIG. 2 is a schematic sectional view taken along line II-II in FIG. 1.

As shown in FIG. 1, 2, the insulator 1 comprises a main body 10, first swaged portions 11, 13, 15, second swaged portions 12, 14, 16, and a mat 4. The insulator 1 is manufactured by coupling an upper member to a lower member, both including a groove shape formed by processing a plate-like member. Details of manufacturing of the insulator 1 will be mentioned later.

The main body 10 is a tubular body configured to cover the side face of the exhaust member 5, which is situated inside the main body 10. The main body 10 extends from the upstream to the downstream along the exhaust member 5 and separates the inside from the outside of the insulator 1.

Each of the first swaged portions 11, 13, 15 and the second swaged portions 12, 14, 16 is a thin, wall-like portion protruding from a side surface of the main body 10. The first swaged portions 11, 13, 15 individually correspond to the second swaged portions 12, 14, 16 to make pairs. The first swaged portions 11, 13, 15 are situated opposite the corresponding second swaged portions 12, 14, or 16 across the main body 10. Each of the first swaged portions 11, 13, 15 and the second swaged portions 12, 14, 16 are formed by coupling the upper member to the lower member by swaging. Details of this swaging will be mentioned later. The number of the first swaged portions and the second swaged portions is not limited to three each, but can be appropriately determined.

The mat 4 fills a space between the main body 10 and the exhaust member 5. The mat 4 covers an inner side of the main body 10 and the side surface of the exhaust member 5. The main body 10 is therefore supported from inside via the mat 4. The mat 4 has a cushioning property and heat-insulating property and accordingly absorbs vibration and/or noise from the exhaust member 5. In one example, the mat 4 may be made of alumina fiber or glass wool.

Method of Manufacturing Insulator

Hereinafter, a method of manufacturing the insulator 1, comprising the exhaust member 5 in the present embodiment will be explained. In the present embodiment, the exhaust member 5 is situated inside the insulator 1. The present method may be construed as a method of manufacturing the exhaust member 5 that comprises the insulator 1, or may also be construed as a method of placing the insulator 1 over the exhaust member 5.

As shown in FIGS. 3 to 14, the insulator 1 is manufactured by coupling a lower member 2 to an upper member 3 by swaging. In one example, the lower member 2 and the upper member 3 are both made of a plate-like stainless-steel or a plate-like aluminum.

The lower member 2 comprises a groove 20, one or more first flanges, and one or more second flanges. In one example, the number of the first flange and the number of the second flange are the same. In the present embodiment, the lower member 2 comprises three first flanges, 21, 23, 25 and three second flanges, 22, 24, 26.

The groove 20 is a groove-like portion that separates the inside from the outside of the insulator 1 and forms the main body 10. An inner side of the groove 20 is covered with a lower mat 40, which is a part of the aforementioned mat 4.

Each of the first flanges 21, 23, 25 and the second flanges 22, 24, 26 is a flange protruding outwardly from a side rim of the groove 20 and extending along the groove 20. Hereinafter, the direction in which the first and second flanges extend along the groove 20 is referred to as a length direction; the distance that the first and the second flanges extend in the length direction is denoted as L; and the distance that the first and the second flanges protrude outwardly from the groove is referred to as a width.

The first flanges 21, 23, 25 individually correspond to the second flanges 22, 24, 26 to make pairs. The first flanges 21, 23, 25 are situated opposite to the corresponding second flanges 22, 24, 26 across the groove 20. In other words, the lower member 2 comprises two (a pair of) flanges that are situated opposite to each other across the groove 20. Within the pair of these flanges, the first flange has the longer L, and the second flange has the shorter L.

Each second flange comprises a flange securing part. In one example, the flange securing part is configured as one or more securing holes that pass through the second flange in a thickness direction (orthogonal to the length direction). In one example, the second flanges 22, 24, 26 respectively comprise securing holes 22a, 24a, 26a.

Each of the first and second flanges is arranged as one flange-shaped portion, but may also be arranged as a portion having two or more flanges disposed along the groove 20.

The upper member 3 is configured in the same manner as the lower member 2. More specifically, the upper member 3 comprises a groove 30, three first flanges 31, 33, 35 and three second flanges 32, 34, 36 in the same manner as in the lower member 2. Also in the same manner as in the lower member 2, an inner side of the groove 30 of the upper member 3 is covered with an upper mat 41, which is a part of the aforementioned mat 4.

The first flanges 31, 33, 35 of the upper member 3 individually correspond to the first flanges 11, 13, 15 of the lower member 2 to make a set of two. The second flanges 32, 34, 36 of the upper member 3 individually correspond to the second flanges 12, 14, 16 of the lower member 2 to make a set of two. Hereinafter, a set of two is also referred to as a set. In one example, a flange of the lower member 2 and the corresponding flange of the upper member 3 in a set may have the identical or substantially identical L. However, L of such flanges in a set may be different from each other.

A method of manufacturing the insulator 1 comprises (1) a lower-retainer placement process, (2) a lower-member placement process, (3) an exhaust-member placement process, (4) an upper-member placement process, (5) an upper-retainer placement process, (6) a first swaging process, (7) a release process, and (8) a second swaging process. Each process will be explained hereinafter. The number of lower retainers, upper retainers, first bases, and second bases to be used in these processes is the same as the number of pairs of flanges that the lower member 2 and the upper member 3 each comprise.

1. Lower-retainer Placement Process

Figure 3:
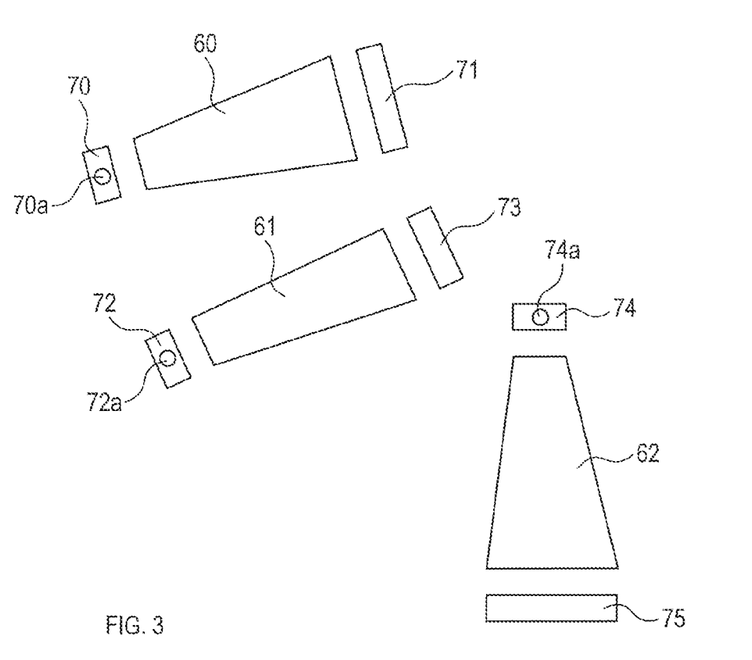
FIG. 3 is a schematic plan view of lower retainers, first bases, and second bases arranged in a lower-retainer placement process.

As shown in FIG. 3, three lower retainers 60 to 62, three first bases 71, 73, 75, and three second bases 70, 72, 74 are arranged. Each of the second bases 70, 72, 74 comprises a base hold. The base hold is configured as one or more fixing projections configured to project upwardly from a top surface of the second base. In one example as shown in FIG. 3, 4, the base holds are arranged as single-pin shaped fixing projections 70a, 72a, or 74a. The shape of the fixing projections may be a square column or a plate, for example. A projecting distance, which is a length of protrusion, of the fixing projections from the top surface changes in accordance with upward-downward movements of the fixing projection. The fixing projection is housed inside the second base as the fixing projection moves downwardly.

The lower retainers 60 to 62 support an outer side of the groove 20 of the lower member 2 from below. Positions of the lower retainers 60 to 62 individually correspond to positions of the pairs of the first and second flanges at the lower member 2. Each lower retainer supports the outer side of the groove 20 from below at an area (hereinafter referred to as the support area) between the corresponding pair of the first and second flanges of the lower member 2.

Figure 4:
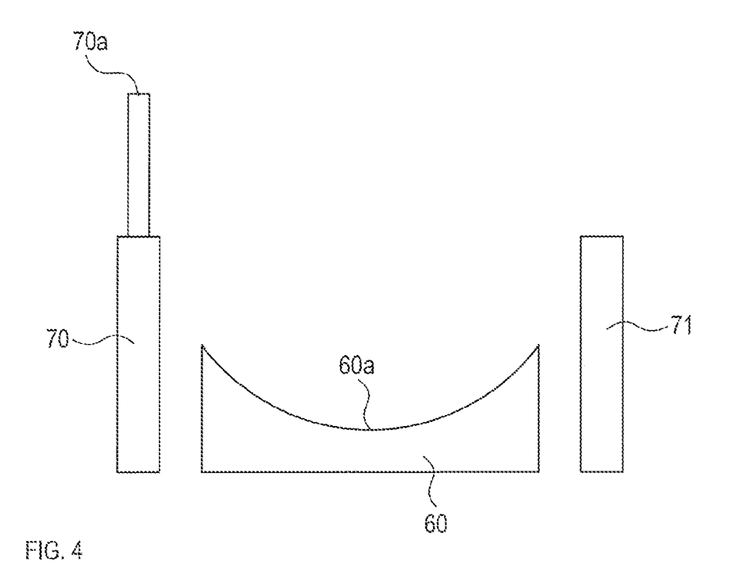
FIG. 4 is a schematic side view of one of the lower retainers, one of the first bases, and one of the second bases arranged in the lower-retainer placement process.

As shown in FIG. 4, the lower retainer 60 comprises a top surface 60a. The lower retainer contacts the support area via the top surface 60a to support the groove 20 from below. The top surface 60a is shaped to match the support area. In one example, the top surface 60a has a shape of an arc in a side view. The entire arc contacts the support area. Likewise, other lower retainers 61, 62 each comprise a top surface and contact the support area via the top surface to support the groove 20 from below.

The first bases 71, 73, 75 individually correspond to the first flanges 21, 23, 25 of the lower member 2. The second bases 70, 72, 74 individually correspond to the second flanges 22, 24, 26 of the lower member 2. The first and second bases each have, in their upper area, a supporting surface configured to abut the corresponding first or second flange. The first and second bases respectively supports the first and second flanges from below via the supporting surface. The supporting surface has the same extent of length as L of the corresponding first or second flange.

As shown in FIG. 3, 4, the first and second bases, respectively supporting the first and second flanges of a pair, are situated to face each other across the lower retainer corresponding to the same pair. The first and second bases and the lower retainer corresponding to the same pair may be integrated together. With respect to the first base and the second base supporting a pair of the first and second flanges, the supporting surface of the first base is longer than the supporting surface of the second base.

2. Lower-Member Placement Process

Figure 5:
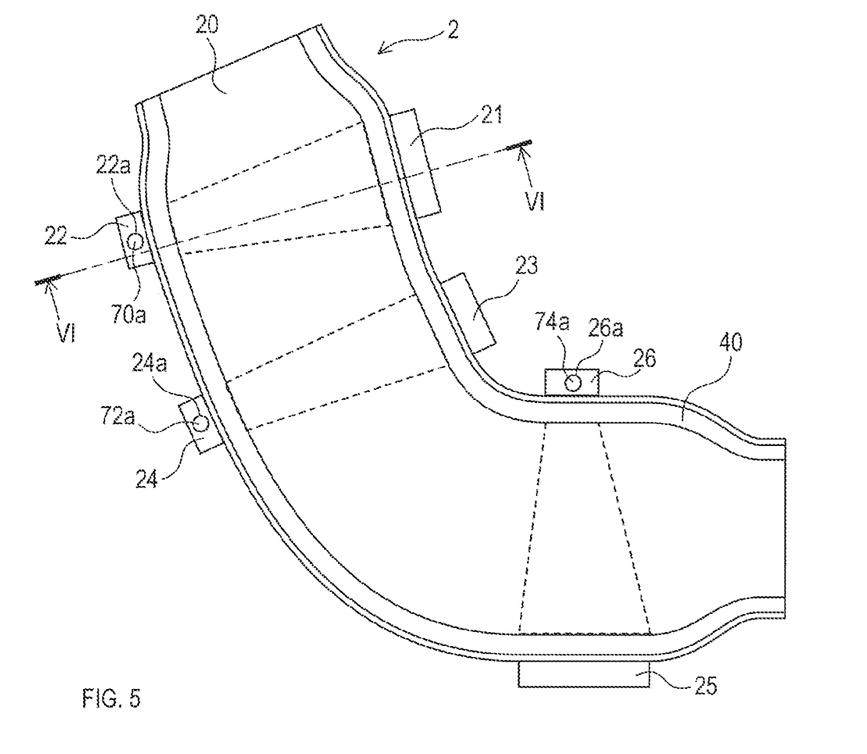
FIG. 5 is a schematic plan view of a lower member and other elements arranged in the lower-member placement process.

The lower-member placement process is performed after the lower-retainer placement process. As shown in FIG. 5, 6, the lower member 2 is arranged in a first state, in which all of the following requirements (a) to (c) are fulfilled.

Figure 6:
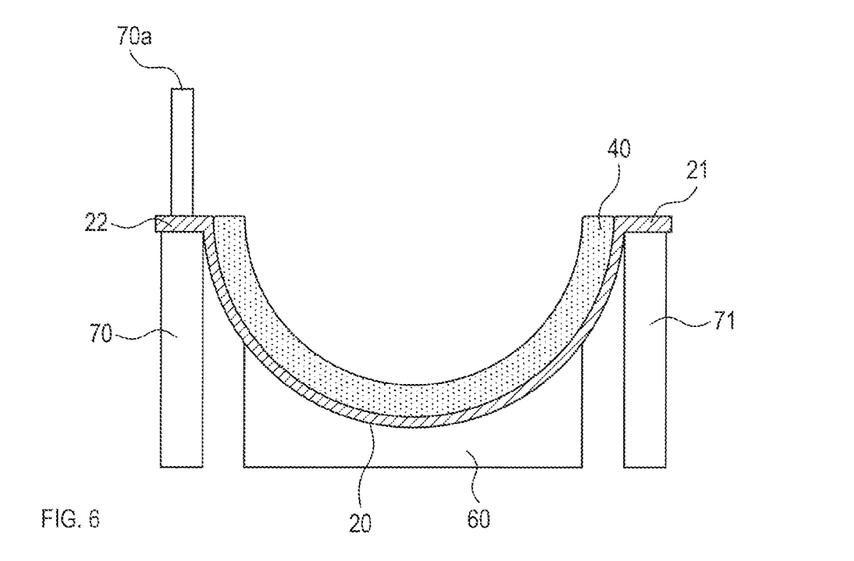
FIG. 6 is a schematic sectional view taken along line VI-VI in FIG. 5.

(a) Each support area on the outer side of the groove 20 is supported from below by the corresponding lower retainer.

(b) Each of the second flanges 22, 24, 26 is supported from below by the corresponding second base. In addition, each of these second flanges 22, 24, 26 is fixed in position via the flange securing part, and a base hold of the corresponding second base. More specifically, positions of the second flanges 22, 24, 26 are fixed as a result of the corresponding fixing projections 70a, 72a, 74a of the second base being respectively fitted to the securing holes 22a, 24a, 26a.

(c) Each of the first flanges 21, 23, 25 is supported from below by the corresponding first base.

3. Exhaust-Member Placement Process

Figure 7:
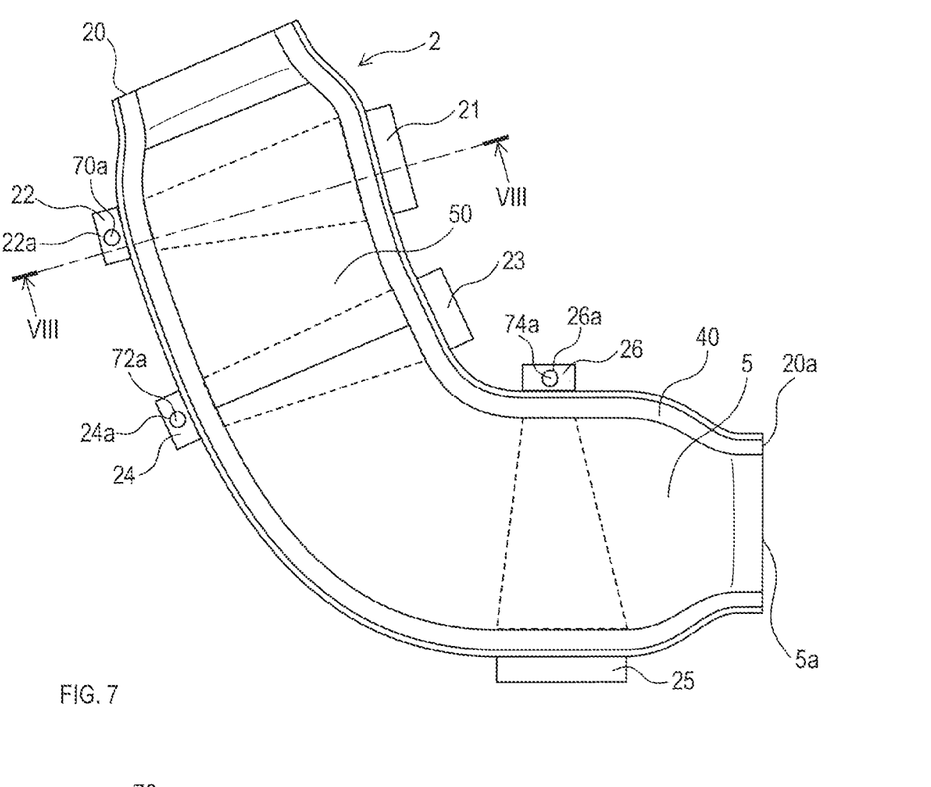
FIG. 7 is a schematic plan view of an exhaust member and other elements arranged in an exhaust-member placement process.
Figure 8:
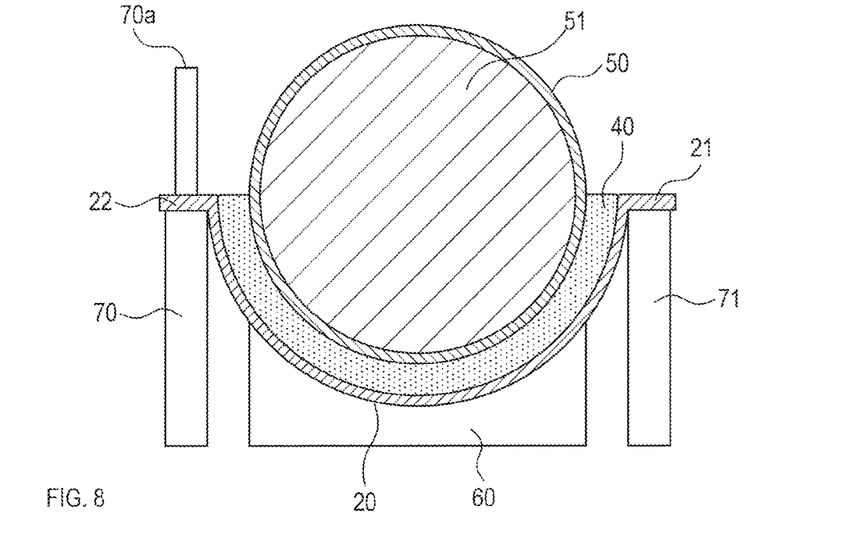
FIG. 8 is a schematic sectional view taken along line VIII-VIII in FIG. 7.

The exhaust-member placement process is performed after the lower-member placement process. As shown in FIG. 7, 8, the exhaust member 5 is disposed inside the groove 20 of the lower member 2 that is arranged in the lower-member placement process. In this placement, the exhaust member 5 is disposed along the groove 20 so that the side surface of the exhaust member 5 abuts the lower mat 40 covering the inner side of the groove 20. In one example, the position of the exhaust member 5 may be determined by matching the position of an end 20a of the groove 20 with the position of an end 5a of the exhaust member 5.

4. Upper-Member Placement Process

Figure 9:
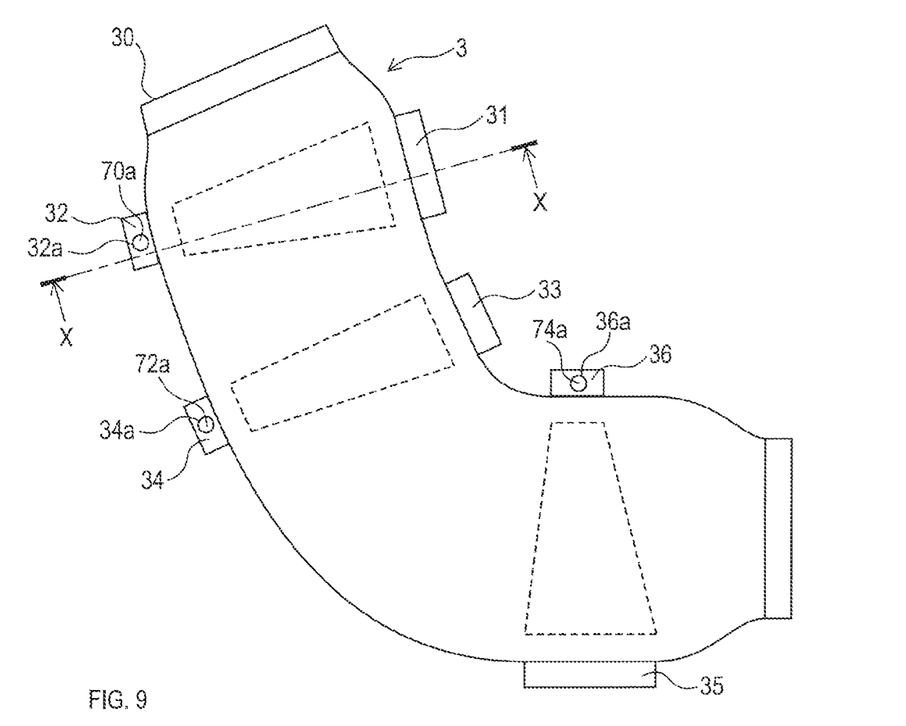
FIG. 9 is a schematic plan view of an upper member and other elements arranged in an upper-member placement process.

The upper-member placement process is performed after the exhaust-member placement process. As shown in FIG. 9, 10, the upper member 3 is arranged in a second state, in which all of the following requirements (d) to (f) are fulfilled.

Figure 10:
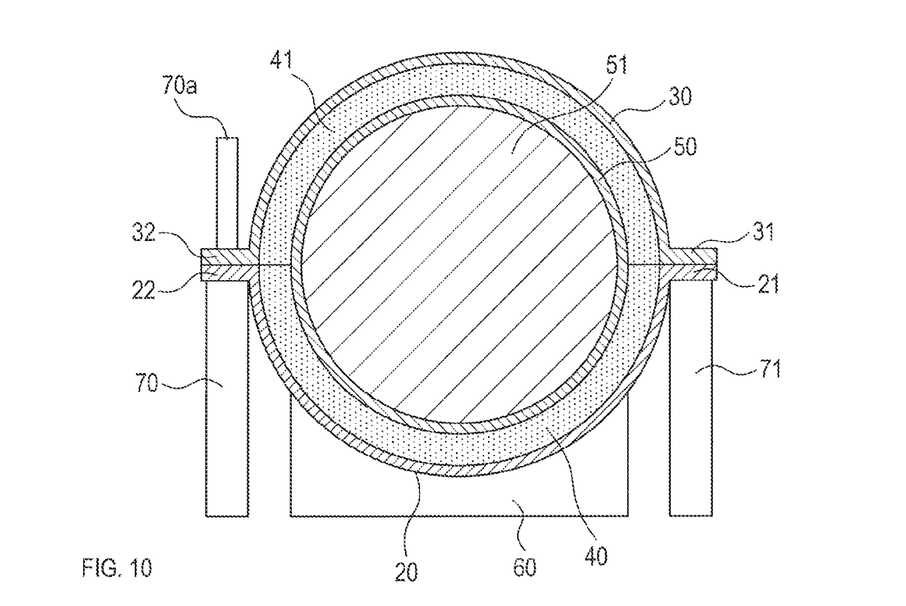
FIG. 10 is a schematic sectional view taken along line X-X in FIG. 9.

(d) An inner side of the groove 30 of the upper member 3 faces the exhaust member 5, disposed on the lower member 2, and the inner side of the groove 20 of the lower member 2 via the interposed upper mat 41.

(e) Each of the first flanges 31, 33, 35 of the upper member 3 abuts the corresponding first flange of the lower member 2 and is simultaneously supported from below by the corresponding first base.

(f) Each of the second flanges 32, 34, 36 of the upper member 3 abuts the corresponding second flange of the lower member 2 and is simultaneously supported from below by the corresponding second base. Additionally, each of these second flanges 32, 34, 36 is fixed in position via the flange securing part, and the base hold of the corresponding second base. More specifically, positions of the second flanges 32, 34, 36 are fixed as a result of the fixing projections 70a, 72a, or 74a of the corresponding second base being respectively fitted to the securing holes 32a, 34a, 36a.

The exhaust member 5 is arranged along the groove 30 in the upper-member placement process. Also, the side surface of the exhaust member 5 is placed in a state of abutting the upper mat 41 covering the inner side of the groove 30.

5. Upper-retainer Placement Process

Figure 11:
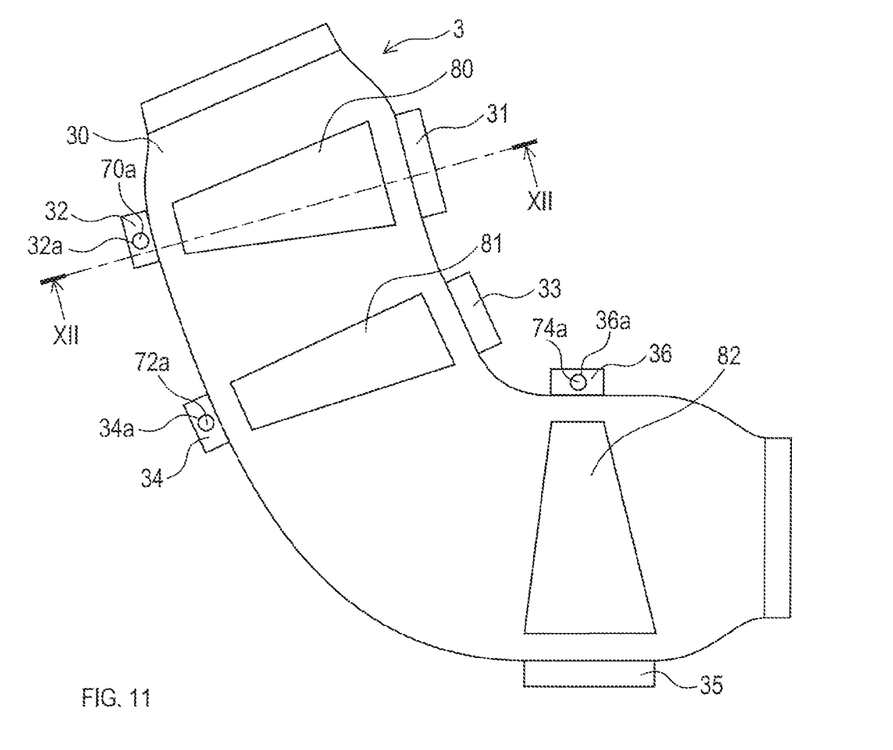
FIG. 11 is a schematic plan view of the upper retainer and other elements arranged in an upper-retainer placement process.

The upper-retainer placement process is performed after the upper-member placement process. As shown in FIG. 11, 12, upper retainers 80 to 82 are each disposed to cover an outer side of the groove 30 of the upper member 3, arranged in the upper-member placement process, from above.

Figure 12:
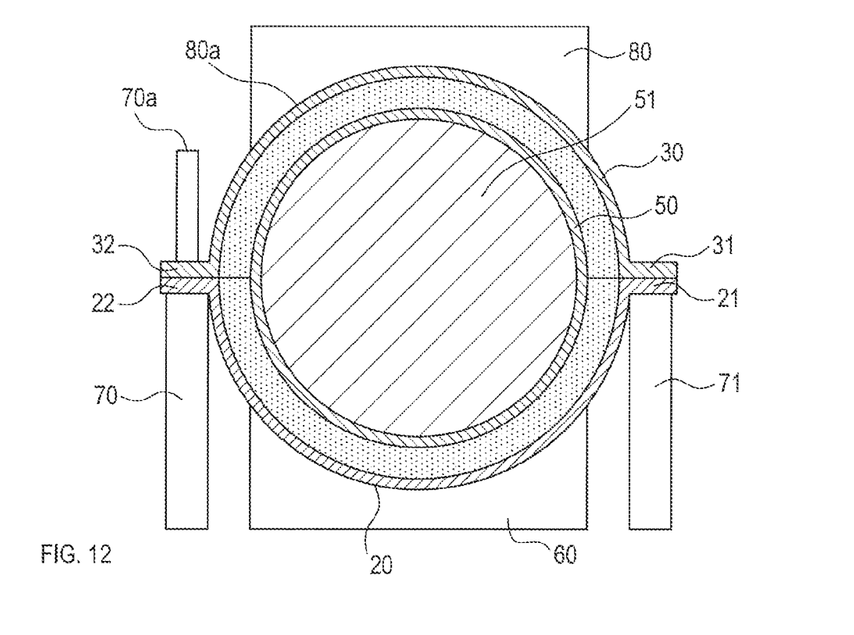
FIG. 12 is a schematic sectional view taken along line XII-XII in FIG. 11.

The upper retainer 80 to 82 are members to press the groove 30 of the upper member 3 from outside and from above. Positions of the upper retainers 80 to 82 individually correspond to positions of the pairs of the first and second flanges of the upper member 3. Each upper retainer presses the groove 30 from outside and from above at an area between the corresponding pair of the first and second flanges of the upper member 3 (hereinafter referred to as the press area).

As shown in FIG. 11, the upper retainer 80 comprises a bottom surface 80a. The upper retainer 80 contacts the press area via the bottom surface 80a to press the groove 30 from above. The bottom surface 80a is shaped to match the press area. In one example, the bottom surface 80a has a shape of an arc in a side view. The entire arc contacts the press area. Likewise, other upper retainers 81, 82 each comprise a bottom surface and contact the press area via the bottom surface to press the groove 30 from above.

Accordingly, the upper retainers 80 to 82 individually face the lower retainers 60 to 62. In other words, the lower member 2 and the upper member 3 are vertically held between the upper retainer and the lower retainer at the areas between a pair of the first and second flanges.

6. First Swaging Process

The first swaging process is performed after the upper-retainer placement process. In the first swaging process, the lower member 2 and the upper member 3 kept being vertically held between the upper retainers 80 to 82 and the lower retainers 60 to 62 between the pair of the first and second flanges on the outside of the grooves 20 and 30. In the present embodiment, the longer flange in the aforementioned pair of the flanges (in other words, the first flange) is swaged first. Each first flange of the lower member 2 and the abutting first flange of the upper member 3 are swaged. By this swaging, the abutting first flanges of the lower member 2 and the upper member 3 are coupled to each other to become the aforementioned first swaged portion. In the present embodiment, the first flanges 21, 23, 25 are simultaneously swaged. However, the first flanges 21, 23, 25 may be swaged in any order.

One example of a full swaging or a partial swaging of the first flanges may be, but not limited to, a pre-folding and a V-shaped crimping. Hereinafter, the pre-folding and the V-shaped crimping on the first flanges 21, 31 will be explained as one example.

Figure 13:
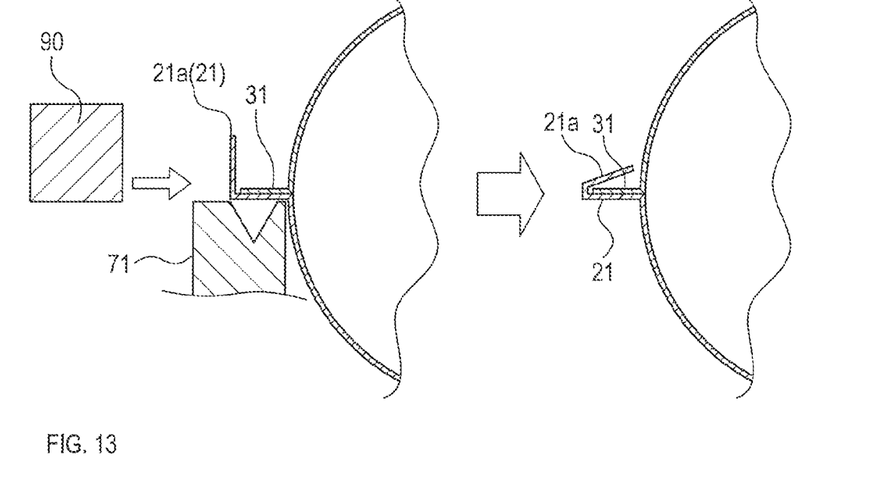
FIG. 13 a diagram describing a pre-folding.

As shown in FIG. 13, the first flange 21 of the lower member 2 is wider than the first flange 31 of the upper member 3. The first flange 21 therefore protrudes more outwardly than the first flange 31 when the upper member is arranged in place in the upper-member placement process. Hereinafter, this part of the first flange 21 protruding more outwardly than the first flange 31 is referred to as an outward flange 21a.

In the pre-folding, a folder 90 folds the outward flange 21a such that the outward flange 21a covers a top surface of the first flange 31. The first flange 21 of the lower member 2 is accordingly placed on an upper side and a lower side of the first flange 31 of the upper member 3. In other words, the first flange 31 of the upper member 3 is held between the folded first flange 21 of the upper member 2.

Figure 14:
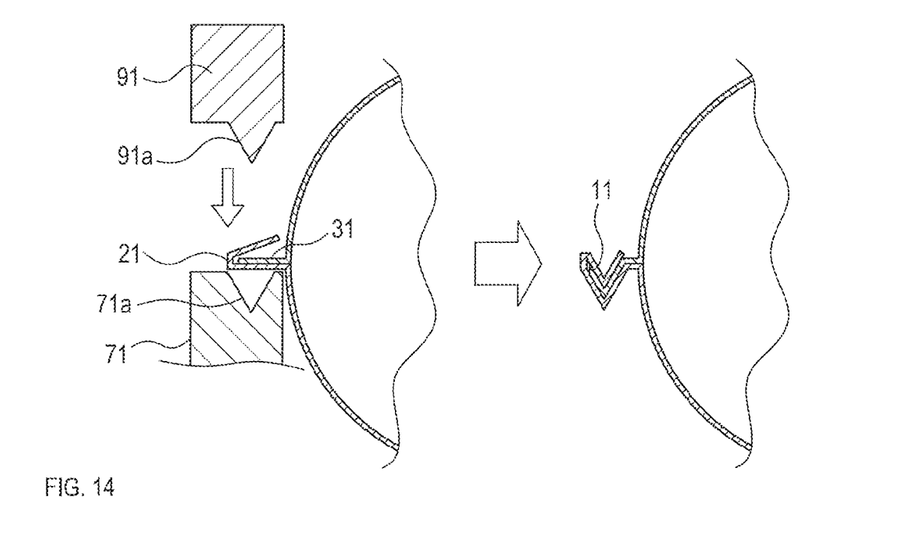
FIG. 14 is a diagram describing a V-shaped crimping.

In the V-shaped crimping, thus layered first flanges 21, 31 are crimped into a downwardly projecting V-shape. Specifically, a top surface of the first base 71, supporting the first flange 21, extends in the length direction of the first flange 21. As shown in FIG. 14, the top surface of the first base 71 includes a dent 71a that extends along the length of the first flange 21. The first flange 21 is supported by the top surface of the first base 71. A cross section of the dent 71a, orthogonal to the length direction, has a V-shape. A crimper 91, used in the V-shaped crimping, has a bottom surface that includes a V-shaped projection 91a. The projection 91a has a shape that matches the shape of the dent 71a and extends in the length direction similarly to the dent 71a. A cross section of the projection 91a, orthogonal to the length direction, also has a V-shape.

The V-shaped crimping is carried out by pressing down the pre-folded first flanges 21, 31 from above by the projection 91a of the crimper 91. The first flanges 21, 31 are thereby crimped into a V-shape from end to end along the length direction. More specifically, the first flanges 21, 31 are crimped to have a V-shaped cross section orthogonal to the length direction. The folder 1 and the crimper may be separate elements, or may be an integrated one element.

7. Release Process

The release process is performed after the first swaging process. In the release process, the fixation of the position of the second flanges of the lower member 2 and the upper member 3, secured by the base hold and the flange securing part, is released. In one example, the fixing projections 70a, 72a, 74a are housed inside the second bases. This removes each fixing projection from the securing hole of the corresponding second flange and consequently releases the fixation of the position of each second flange. For example, the fixation of the position may be released by removing the fixing projections upwardly from the securing holes of the second flanges.

8 Second Swaging Process

The second swaging process is performed after the release process. In the second swaging process, the lower member 2 and the upper member 3 kept being vertically interposed between the upper retainers 80 to 82 and the lower retainers 60 to 62 between the first flanges and the second flanges on the outside of the grooves 20 and 30. Each second flange of the lower member 2 and the abutting second flange of the upper member 3 (the set of the second flanges) are swaged. By this swaging, each set of the second flanges of the lower member 2 and the upper member 3 is coupled to each other to become the aforementioned second swaged portion. In the present embodiment, the second flanges 22, 24, 26 are simultaneously swaged. However, the second flanges 22, 24, 26 may be swaged in any order.

One example of a full swaging or partial swaging of the second flanges may be, but not limited to, the aforementioned pre-folding and V-shaped crimping.

Effect (1) Conventional insulators used for turbocharged converters are heavyweight with thick plates. Such an insulator has therefore been attached, with a bolt, to brackets placed outside an exhaust member where a converter is disposed. As a consequence, there has been a risk that the vibration of the converter is transmitted to the insulator via the brackets or other elements, which then generates noise.

Compared with the conventional insulators, the insulator 1 in the present embodiment is lightweight with an extremely thin plate, and is supported by the mat 4 from inside. As a consequence, the vibration of the converter 50 is absorbed by the mat 4, which leads to a reduction of noise compared with before.

When plate-shaped members having low stiffness are coupled by swaging, there is a risk of deformation of the plate-shaped members. In order to have sufficient stiffness to avoid deformation, it has been generally believed that those plate-shaped members that are to be coupled by swaging need be at least as thick as 1.0 mm. In contrast, thickness of the lower member 2 and the upper member 3 that together form the insulator 1 of the present embodiment is one-third or less than the thickness of conventional plate-shaped members. This is extremely thin; and therefore the lower member 2 and the upper member 3 have low stiffness. The lower member 2 and the upper member 3 could deform if swaged by conventional methods.

Meanwhile, in the method of manufacturing the insulator in the present embodiment, the second flanges of the lower member 2 and the upper member 3 are fixed to the second bases 70, 72, 74 via the flange securing parts and the base holds when the first flanges of the lower member 2 and the upper member 3 are swaged. In addition, the groove 20 of the lower member 2 is supported from below by the lower retainers 60 to 62, and the groove 30 of the upper member 3 is pressed from above by the upper retainers 80 to 82. In other words, the swaging is carried out as the lower member 2 and the upper member 3 kept being vertically held between the upper retainers 80 to 82 and the lower retainers 60 to 62. The entire lower member 2 and upper member 3 are therefore favorably fixed when swaging the first flanges, which results in reduction of deformation of both or one of the lower member 2 and the upper member 3.

Likewise, the groove 20 of the lower member 2 is supported from below by the lower retainers 60 to 62, and the groove 30 of the upper member 3 is pressed form above by the upper retainers 80 to 82, when the second flanges are swaged. In other words, the swaging is also carried out as the lower member 2 and the upper member 3 kept being vertically held between the upper retainers 80 to 82 and the lower retainers 60 to 62. The first flanges have already been coupled by swaging. The entire lower member 2 and upper member 3 are therefore favorably fixed when swaging the second flanges, which also results in reduction of deformation of both or one of the lower member 2 and the upper member 3.

Accordingly, a low-stiffness insulator 1 can be favorably manufactured.

(2) In the method of manufacturing the insulator in the present embodiment, the exhaust member 5 is placed inside the lower member 2 in the exhaust-member placement process first, and then the upper member 3 is disposed in the upper-member placement process. Thus, the exhaust member can be preferably placed.

(3) In the method of manufacturing the insulator in the present embodiment, the base hold of the second base is configured as the fixing projection, and the flange securing part of the second flange is configured as the securing hole. The position of the second flanges can be preferably fixed as a result of the corresponding fixing projections of the second bases being individually fitted to the securing holes of the second flange. Thus, the second flange can be preferably fixed.

(4) In the first and the second swaging process, the flanges are entirely or partially pre-folded and V-shape crimped. Accordingly, the flanges can be coupled in a preferable manner.

(5) The exhaust member 5, around which the insulator 1 is disposed, is configured to carry the exhaust air downstream towards the turbine that drives the turbocharger. Thus, a low-stiffness insulator 1 can be favorably manufactured.

(6) In the lower member 2, the second flanges each having the securing hole are positioned opposite to the corresponding first flanges across the groove 20. The position of the lower member 2 and the position of the upper member 3 are accurately determined. As a consequence, a highly accurately shaped insulator can be manufactured by swaging.

Other Embodiment (1) In the method of manufacturing the insulator 1 in the aforementioned embodiment, the lower member 2 and the upper member 3 are fixed in position via the base holds of the second bases and the flange securing parts of the second flanges. Nevertheless, the lower member 2 and the upper member 3 may also be fixed in position in other manners, such as by vertically holding or laterally supporting the second flanges by a given member, for example.

(2) The main body 10 of the insulator 1 in the aforementioned embodiment is supported from inside via the mat 4 that covers the exhaust member 5. Nevertheless, instead of the mat 4, the main body 10 may also be supported from inside, for example, via one or more brackets or the like that are disposed on the exhaust member 5. In this case, the exhaust member 5, situated inside the groove 20 of the lower member 2, is supported by the one or more brackets or the like in the exhaust-member placement process. Additionally, in the upper-member placement process, the inner side of the groove 30 of the upper member 3 is supported by one or more brackets or the like.

(3) In the aforementioned embodiment, the upper member 3 is disposed in the upper-member placement process after the exhaust member 5 is disposed in the exhaust-member placement process. Nevertheless, for example, the exhaust member 5 may be disposed between the lower member 2 and the upper member 3 after the upper member 3 is disposed. Alternatively, for example, the exhaust member 5 may be disposed between the lower member 2 and the upper member 3 after the lower member 2 and the upper member 3 are coupled together by swaging.

(4) Two or more functions achieved by one element in the aforementioned embodiment may be achieved by two or more elements; and one function achieved by one element in the aforementioned embodiment may be achieved by two or more elements. Two or more functions achieved by two or more elements in the aforementioned embodiment may be achieved by one element; one function achieved by two or more elements may be achieved by one element. A part of the configuration of the aforementioned embodiment may be omitted. At least a part of the configuration of the aforementioned embodiment may be added to or replaced with another configuration of the aforementioned embodiment.

What is claimed is:

1. A method of manufacturing an insulator from a lower member and an upper member, the insulator being a tubular member configured to cover a side surface of an exhaust member, the exhaust member being configured to carry exhaust air from an engine of a vehicle downstream, the lower member including a groove, a first flange of the lower member and a second flange of the lower member protruding outwardly from a side rim of the groove of the lower member, the upper member including a groove, a first flange of the upper member and a second flange of the upper member protruding outwardly from a side rim of the groove of the upper member, the method comprising:
placing the lower member in a first state,
wherein the first flange of the lower member is situated opposite to the second flange of the lower member across the groove of the lower member,
wherein the first state includes:
an outer side of the groove of the lower member being supported from below by a lower retainer;
the first flange of the lower member being supported from below by a first base;
the second flange of the lower member being supported from below by a second base; and
the second flange of the lower member being fixed in position by a base hold situated in the second base and by a lower member flange securing part disposed in the second flange of the lower member,
placing the upper member in a second state,
wherein the first flange of the upper member is situated opposite to the second flange of the upper member across the groove of the upper member,
wherein the second state includes:
an inner side of the groove of the upper member facing an inner side of the groove of the lower member;
the first flange of the upper member abutting the first flange of the lower member and being simultaneously supported from below by the first base;
the second flange of the upper member abutting the second flange of the lower member and being simultaneously supported from below by the second base; and
the second flange of the upper member being fixed in position by the base hold situated in the second base and by an upper member flange securing part disposed in the second flange of the upper member,
placing an upper retainer to cover an outer side of the groove of the upper member from above,
swaging the first flange of the upper member with the abutted first flange of the lower member, and
swaging the second flange of the upper member with the abutted second flange of the lower member.

2. The method according to claim 1,
wherein the exhaust member is disposed inside the groove of the lower member after placing the lower member in the first state, and
wherein, in the second state, the inner side of the groove of the upper member faces the exhaust member and the inner side of the groove of the lower member.

3. The method according to claim 1,
wherein the base hold includes a projecting portion projecting upwardly from the second base,
wherein the lower member flange securing part and the upper member flange securing part each include a hole formed on the second flange of the upper member and a hole formed on the second flange of the lower member,
wherein, in the first state, the second flange of the lower member is fixed in position due to the projecting portion of the second base being fitted to the hole formed on the second flange of the lower member,
wherein, in the second state, the second flange of the upper member is fixed in position due to the projecting portion of the second base being fitted to the hole formed on the second flange of the upper member,
wherein the projecting portion of the second base is removed from the holes of the second flange of the lower member and the second flange of the upper member after the first flange of the upper member is swaged with the first flange of the lower member, and
wherein the second flange of the upper member is swaged with the second flange of the lower member after the removal of the projecting portion.

4. The method according to claim 1,
wherein, in the swaging of the first flange of the upper member with the abutted first flange of the lower member, and in the swaging of the second flange of the upper member with the abutted second flange of the lower member, at least
the first flange of the lower member is folded and placed on an upper side and a lower side of the first flange of the upper member to form a folded flange, or the second flange of the lower member is folded and placed on an upper side and a lower side of the second flange of the upper member to form a folded flange, and wherein the folded flange is crimped to form a downwardly projecting V-shape.

5. The method according to claim 1, wherein the exhaust member is configured to carry the exhaust air downstream towards a turbine that drives a turbocharger disposed in the engine.

* * * * *